P. WACHTEL.
WIRE HOLDER FOR CEMENT POSTS.
APPLICATION FILED OCT. 12, 1908.
920,407.
Patented May 4, 1909.
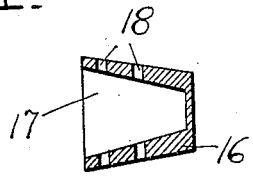
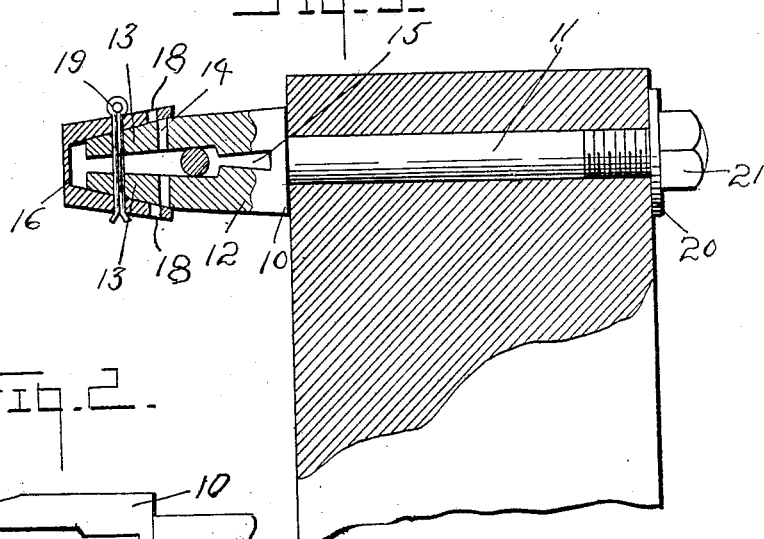
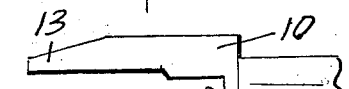
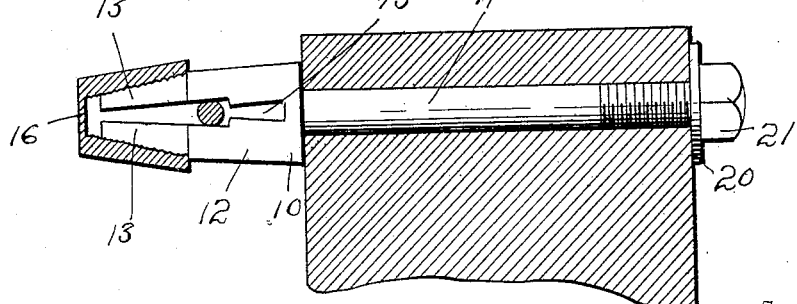
Inventor
Peter Wachtel.

UNITED STATES PATENT OFFICE.

PETER WACHTEL, OF GENESEO, ILLINOIS.

WIRE-HOLDER FOR CEMENT POSTS.

No. 920,407.     Specification of Letters Patent.     Patented May 4, 1909.

Application filed October 12, 1908. Serial No. 457,361.

*To all whom it may concern:*

Be it known that I, PETER WACHTEL, a citizen of the United States, residing at Geneseo, in the county of Henry and State of Illinois, have invented certain new and useful Improvements in Wire-Holders for Cement Posts, of which the following is a specification.

This invention relates to fences, and more particularly to means for securing wires to cement posts, and has for its object to provide a simple and inexpensive device of this class which may be operated without the use of special tools.

A particular object of the device is to provide a novel form of wire gripping head and a fastening member engageable thereover to hold the wire securely against slipping and prevent its disengagement from the head.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a detailed view of the gripper, Fig. 2 is a detail view of the slidable head, Fig. 3 is a sectional view of the head of the device having a wire engaged therewith in operative position, Fig. 4 is a side view of a modified form of the device, showing a cap therefor in cross section.

Referring to the drawings, there is shown a wire clamp comprising a gripping member 10 having an outwardly threaded shank 11 adapted for engagement through a post and having at one end opposite the threaded portion a bifurcated head portion 12 comprising spaced jaws 13 having registering series of spaced perforations 14 therethrough adjacent their outer ends. A longitudinally extending slot 15 is formed in the bight of the head 12 communicating with the space between the jaws and extending longitudinally inward for a purpose to be subsequently indicated. Disposed in slidable wedged engagement over the jaws 13 there is a compressing cap 16 having convergent walls 17 provided with registering series of perforations 18 therethrough spaced differently from and adapted to register at times with the openings 14 and having a cotter pin 19 engaged therethrough to retain the cap in operative position.

The opposite end of the shank is disposed outwardly of the post, and receives thereover a collar or washer 20 outwardly of which there is a nut 21 serving to hold the bolt in secure engagement with the post, the head 12 being drawn tightly against the post as will be understood. It will be understood that the shank 11 may be formed in any suitable shape, and any other suitable means desirable may be utilized for securing it to the post. It would be possible to form the shank angularly, so that it might be embedded in the post when molded, if desired, such changes involving mechanical adaptation which it is not believed necessary to embody in the specification.

In operation, the head 12 is disposed with the jaws in a vertical plane, and a fence wire engaged therebetween as will be understood. The jaws 13 are so spaced as to receive the wire slidably therein, to engage against the bight portion of the head at the entrance of and on each side of the slot 15. The cap 16 is then engaged over the outer ends of the jaws and forced downwardly thereover until the openings 18 register with those 14, when the pin 19 is inserted to retain the parts in operative position. It will be noted that the slot 15 is narrower than the space between the jaws and the distance between the inner ends of the slot and the outer edge of the head at its base, is a trifle less than the thickness of the jaws 13 at their thickest portion, so that when the cap 16 is engaged thereover, the jaws may be forced into engagement with the wire at their bases. After the jaws have become engaged against the wire, continued movement of the cap 16 will bend the jaws themselves, until the openings in the cap become registered with those in the jaws, where the pin 19 is positioned.

It will be understood that the shape of the head may be changed as found desirable in the accomplishment of the objects stated and the desired manner of operation, within the scope of the claims.

In Fig. 5, there is shown a modified form of the device in which the outer ends of the jaws are serrated and the inner faces of the convergent walls of the cap are similarly serrated and the perforations through the cap and jaws eliminated. In this manner the cap automatically grips the jaws as it is driven thereover.

What is claimed is:—

1. A wire holder for posts including a head having spaced wire-engaging portions, said head having a longitudinally extending slot therein narrower than and communicating with the space between the engaging portion, said jaws being adapted to receive a wire loosely therebetween, and means for compressing and securing said engaging portions in engagement with a wire.

2. A wire holder of the class described including spaced wire engaging portions, said members being tapered toward their extremities upon their outer sides and having serrations upon their outer faces, and a wedge cap having converging serrated faces adapted to be forced thereover to compress the engaging members into engagement with a wire, and to be held against disengagement.

In testimony whereof I affix my signature, in presence of two witnesses.

PETER WACHTEL.

Witnesses:
S. EDITH MOORE,
HENRY WACHTEL.